(12) United States Patent
Ali et al.

(10) Patent No.: US 12,091,019 B2
(45) Date of Patent: Sep. 17, 2024

(54) OCCUPANT DETECTION SYSTEM FOR DETERMINING POSITION IN A VEHICLE BASED ON COARSE-GRAINED LOCALIZATION

(71) Applicant: GM Global Technology Operations LLC, Detroit, MI (US)

(72) Inventors: Kamran Ali, Troy, MI (US); Mohammad Naserian, Windsor (CA); Lakshmi V. Thanayankizil, Troy, MI (US); Bhargavi Chandrakumar, Clinton Township, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 17/699,726

(22) Filed: Mar. 21, 2022

(65) Prior Publication Data
US 2023/0294705 A1    Sep. 21, 2023

(51) Int. Cl.
*B60W 40/08* (2012.01)
*G06V 20/59* (2022.01)

(52) U.S. Cl.
CPC ............. *B60W 40/08* (2013.01); *G06V 20/59* (2022.01); *B60W 2040/0881* (2013.01); *B60W 2540/01* (2020.02)

(58) Field of Classification Search
CPC ......... B60W 40/08; B60W 2040/0881; B60W 2540/01; G06V 20/59; G06V 20/593; G01S 13/756; G01S 13/758; G01S 13/753; G01S 13/878; G01S 13/04; H04W 4/02; H04W 4/40; H04W 64/00; B60N 2/002; B60N 2/0021; B60N 2/0024; B60N 2/0027;
(Continued)

(56) References Cited

U.S. PATENT DOCUMENTS

| | | | |
|---|---|---|---|
| 5,602,734 A * | 2/1997 | Kithil | B60R 21/213 280/735 |
| 7,106,203 B2 * | 9/2006 | Edwards | G08B 21/22 340/539.15 |
| 11,600,278 B2 | 3/2023 | Khamis et al. | |

(Continued)

FOREIGN PATENT DOCUMENTS

| | | |
|---|---|---|
| DE | 10144877 A1 | 4/2003 |
| DE | 10341578 A1 | 4/2005 |
| DE | 102007055091 A1 | 5/2009 |

*Primary Examiner* — Ryan W Sherwin
(74) *Attorney, Agent, or Firm* — Vivacqua Crane, PLLC

(57) ABSTRACT

An occupant detection system for determining a unique position of a detected presence within an interior cabin area of a vehicle includes a plurality of signal conversion devices each including conversion circuitry. Each of the plurality of signal conversion devices are assigned to a specific position within the interior cabin area of the vehicle. The conversion circuitry for the plurality of signal conversion devices include unique sub-carrier frequency that corresponds to the unique position within the interior cabin area of the vehicle. The occupant detection system includes a wireless control module including a multi-band transceiver having a first transceiver configured to transmit and receive signals on a first frequency band and a second transceiver configured to transmit and receive signals on a second frequency band.

20 Claims, 4 Drawing Sheets

(58) Field of Classification Search
CPC ...... B60N 2/0034; G01C 21/20; G08C 17/02; H04B 1/005–0096
See application file for complete search history.

(56) References Cited

U.S. PATENT DOCUMENTS

| | | | |
|---|---|---|---|
| 2002/0136176 A1 | 9/2002 | Abeta et al. | |
| 2002/0140215 A1* | 10/2002 | Breed | B60R 11/0241 |
| | | | 280/735 |
| 2004/0119599 A1* | 6/2004 | Stevenson | B60R 22/48 |
| | | | 340/686.1 |
| 2004/0130442 A1* | 7/2004 | Breed | G06V 20/593 |
| | | | 340/449 |
| 2007/0221428 A1* | 9/2007 | Strutz | B60R 22/48 |
| | | | 180/268 |
| 2008/0077546 A1* | 3/2008 | Hofbeck | B60R 21/01534 |
| | | | 706/46 |
| 2009/0017838 A1* | 1/2009 | Laroia | H04W 48/18 |
| | | | 455/456.1 |
| 2013/0314223 A1* | 11/2013 | Masudaya | B60R 16/0232 |
| | | | 340/457.1 |
| 2019/0097865 A1* | 3/2019 | Xu | A61B 5/113 |
| 2020/0169275 A1* | 5/2020 | Chahal | H04B 1/005 |
| 2020/0172049 A1* | 6/2020 | Scheele | B60R 16/03 |
| 2023/0039726 A1* | 2/2023 | Ricart | H04L 69/14 |
| 2023/0262750 A1 | 8/2023 | Krajnc et al. | |
| 2023/0341535 A1 | 10/2023 | Zhang et al. | |

\* cited by examiner

OCCUPANT DETECTION SYSTEM FOR DETERMINING POSITION IN A VEHICLE BASED ON COARSE-GRAINED LOCALIZATION

INTRODUCTION

The present disclosure relates to an occupant detection system that determines a unique position of a detected presence within an interior cabin area of a vehicle based on coarse-grained localization. The occupant detection system includes a wireless control module having a multi-band transceiver in wireless communication with a plurality of signal conversion devices that are each assigned to a unique position within an interior cabin area of a vehicle.

Occupant detection systems may be used to detect the presence of an individual located within the interior cabin of a vehicle. Various technologies currently exist for detecting the presence of an individual within the interior cabin of a vehicle. For example, one type of occupant detection system may include weight sensors disposed within the seats of the vehicle to detect the presence of an individual. However, weight sensors may be expensive, and are mainly used only on higher-end or luxury vehicles. Camera-based systems for detecting occupants within the interior cabin also exist, however, cameras may introduce privacy-related issues. Small-scale radio frequency (RF) sensors, such as radar sensors, may also be used as well, however, these sensors are also relatively expensive.

Wireless sensing technologies may be used to detect events or certain changes in the surrounding environment based on CSI estimation. Wireless sensing technologies reuse existing infrastructure already being used for wireless communication, and therefore is cost-effective and relatively easy to deploy. CSI estimation represents how wireless signals propagate from the transmitter to the receiver at certain carrier frequencies along multiple paths. However, wireless sensing technologies require two or more wireless control modules to be installed within a vehicle for presence detection, while most vehicles presently available include only a single wireless control module. Introducing additional wireless modules increases the cost and complexity of a vehicle.

Thus, while current occupant detection systems achieve their intended purpose, there is a need in the art for an improved, cost-effective approach for detecting occupants within a vehicle.

SUMMARY

According to several aspects, an occupant detection system for determining a unique position of a detected presence within an interior cabin area of a vehicle is disclosed. The occupant detection system includes a plurality of signal conversion devices each including conversion circuitry, where each of the plurality of signal conversion devices are assigned to a specific position within the interior cabin area of the vehicle, and wherein the conversion circuitry for each of the plurality of signal conversion devices include unique sub-carrier frequency that corresponds to the unique position within the interior cabin area of the vehicle. The occupant detection system also includes a wireless control module including a multi-band transceiver having a first transceiver configured to transmit and receive signals on a first frequency band and a second transceiver configured to transmit and receive signals on a second frequency band, where each unique sub-carrier frequency of the plurality of signal conversion devices is part of an of an overall frequency spectrum of the second frequency band, and where the wireless control module executes instructions to determine the detected presence within the interior cabin area of the vehicle based on detecting an absence of one or more unique sub-carrier frequencies that are part of the overall frequency spectrum of the second frequency band. In response to determining the detected presence within the interior cabin area of the vehicle, the control module determines the unique position of the detected presence within the interior cabin area by correlating a missing sub-carrier frequency that is part of the overall frequency spectrum of the second frequency band with a corresponding unique position within the interior cabin area of the vehicle.

In an aspect, the unique position of the detected presence indicates a seat position within the interior cabin area of the vehicle.

In another aspect, the seat position includes one or more of the following: a driver seat, a passenger seat, a rear seat behind the driver, a middle seat, a rear seat behind a passenger, a third row seat behind the driver, and a third row seat behind the passenger.

In yet another aspect, the plurality of signal conversion devices are integrated into a covering of a respective seat of the vehicle.

In an aspect, the conversion circuitry includes a sub-carrier bandpass filter having a sub-carrier passband that is equal to the unique sub-carrier frequency assigned to a corresponding signal conversion device.

In another aspect, the conversion circuitry of each of the plurality of signal conversion devices include a combined low-noise amplifier with bandpass filter.

In yet another aspect, the combined low-noise amplifier and bandpass filter includes a bandpass filter including a passband having a center frequency at a first bandpass frequency.

In an aspect, the conversion circuitry of each of the plurality of signal conversion devices include a mixer and a local oscillator that convert the signals on the first frequency band into the signals on the second frequency band.

In another aspect, the wireless control module supports a wireless communication protocol that employs training symbols for performing CSI estimation.

In yet another aspect, the plurality of signal conversion devices are radio frequency (RF) tags.

In an aspect, the interior cabin area of the vehicle includes cargo areas of the vehicle.

In another aspect, the interior cabin area of the vehicle includes areas immediately outside of the interior cabin area that are within wireless sensing proximity of the wireless control module.

In an aspect, an occupant detection system for determining a seat position of a detected presence within an interior cabin area of a vehicle. The occupant detection system includes a plurality of signal conversion devices each including conversion circuitry, where each of the plurality of signal conversion devices are assigned to a specific position within the interior cabin area of the vehicle, and wherein the conversion circuitry for each of the plurality of signal conversion devices include unique sub-carrier frequency that corresponds to the seat position within the interior cabin area of the vehicle. The occupant detection system also includes a wireless control module including a multi-band transceiver having a first transceiver configured to transmit and receive signals on a first frequency band and a second transceiver configured to transmit and receive signals on a second frequency band, where each unique sub-carrier frequency of the plurality of signal conversion devices is part of an of an overall frequency spectrum of the second frequency band. The wireless control module executes instructions to determine the detected presence within the interior cabin area of the vehicle based on detecting an absence of one or more unique sub-carrier frequencies that are part of the overall frequency spectrum of the second frequency band, and in response to determining the detected presence within the interior cabin area of the vehicle, the control module determines the seat position of the detected presence within the interior cabin area by correlating a missing sub-carrier frequency that is part of the overall frequency spectrum of the second frequency band with a corresponding seat position within the interior cabin area of the vehicle.

In another aspect, the seat position includes one or more of the following: a driver seat, a passenger seat, a rear seat behind a driver, a middle seat, a rear seat behind a passenger, a third row seat behind the driver, and a third row seat behind the passenger.

In yet another aspect, the plurality of signal conversion devices are integrated into a covering of a respective seat of the vehicle.

In an aspect, the conversion circuitry includes a sub-carrier bandpass filter having a sub-carrier passband that is equal to the unique sub-carrier frequency assigned to a corresponding signal conversion device.

In another aspect, the conversion circuitry of each of the plurality of signal conversion devices include a combined low-noise amplifier with bandpass filter.

In yet another aspect, the combined low-noise amplifier and bandpass filter includes a bandpass filter including a passband having a center frequency at a first bandpass frequency.

In an aspect, the conversion circuitry of each of the plurality of signal conversion devices include a mixer and a local oscillator that convert the signals on the first frequency band into the signals on the second frequency band.

In another aspect, the interior cabin area of the vehicle includes cargo areas of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
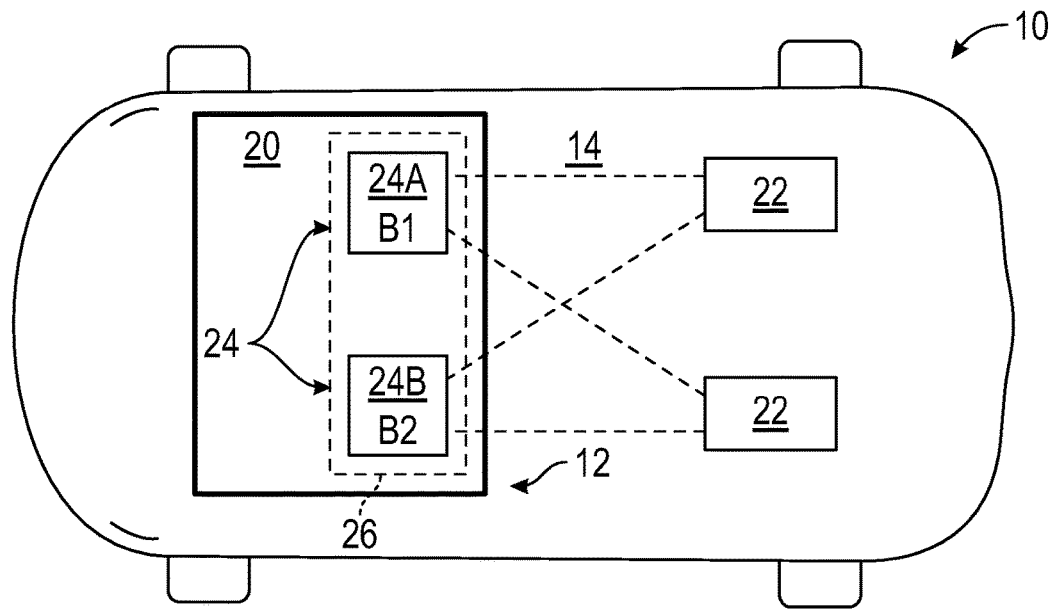
FIG. 1 is a schematic diagram of the disclosed occupant sensing system for an interior cabin of a vehicle that includes a wireless control module and one or more signal conversion devices, according to an exemplary embodiment.

Referring to FIG. 1, an exemplary occupant detection system 12 for detecting the presence of one or more occupants within an interior cabin area 14 of a vehicle 10 is illustrated. The vehicle 10 may be any type of vehicle such as, but not limited to, a sedan, truck, sport utility vehicle, van, or motor home. The occupant detection system 12 includes a wireless control module 20 in wireless communication with one or more signal conversion devices 22 disposed within the interior cabin area 14 of the vehicle 10. As explained below, the one or more signal conversion devices 22 may be placed in strategic positions within the interior cabin area 14 of the vehicle 10. The wireless control module 20 includes a multi-band transceiver 26 having two or more transceivers 24, where each transceiver 24 supports a unique frequency band. It is to be appreciated that the wireless control module 20 supports any wireless communication protocol that employs training symbols for performing channel state information (CSI) estimation. It is to be appreciated that the training symbols also include pilot symbols, with the assumption that the receiving transceiver 24 of the wireless control module 20 is aware in advance of what is transmitted. For example, in one non-limiting embodiment, the wireless control module 20 supports wireless communication according to one or more of the Institute of Electrical and Electronics Engineers (IEEE) 802.11 wireless local area network (WLAN) related standards.

Although FIG. 1 illustrates the occupant detection system 12 for detecting occupants within the interior cabin area 14 of the vehicle 10, it is to be appreciated that the occupant detection system 12 is not limited to a vehicle. Indeed, the disclosed occupant detection system 12 may be used in any other application that detects the presence of an occupant in an enclosed space. In other words, in another embodiment, the interior cabin area 14 shown in FIG. 1 is an enclosed space, such as a room, that is part a building. In an example, the occupant detection system 12 may be used to detect the presence of individuals in a particular room of a building, such as a bedroom of a residential home or a meeting room in an office complex.

In the example as shown in FIG. 1, the wireless control module 20 includes two transceivers 24A, 24B, however, it is to be appreciated that FIG. 1 is merely exemplary in nature and the wireless control module 20 may include more than two transceivers 24 as well. Specifically, FIG. 1 illustrates a first transceiver 24A configured to transmit and receive signals on a first frequency band B1 and a second transceiver 24B configured to transmit and receive signals on a second frequency band B2. In one example where the wireless control module 20 supports wireless communication according to IEEE 802.11 WLAN standards, the first transceiver 24A transmits and receives signals on the 2.4 Gigahertz (GHz) frequency band and the second transceiver 24B transmits and receives signals on the 5 GHz frequency band. As explained below, one of the transceivers 24 of the wireless control module 20 transmits signals that are either up-converted or down-converted by one or more of the signal conversion devices 22 from one frequency band to another frequency band, where the up-converted or down-converted signal is received by another transceiver 24, and the wireless control module 20 executes instructions to determine the presence of individuals within the interior cabin area 14 based on CSI estimation. As also explained below, in embodiments the occupant detection system 12 determines a position of a detected presence within the vehicle 10 based on coarse-grained localization. The position of the detected presence indicates a seat position within the interior cabin area 14 of the vehicle 10.

In the example as shown in FIG. 1, the wireless control module 20 includes all of the transceivers 24. Therefore, the vehicle 10 includes only one wireless control module 20, which results in reduced cost. However, in another embodiment, one or more transceivers 24 may be located on another control module located either inside or within wireless proximity the interior cabin area 14 of the vehicle 10. For example, in an embodiment, one or more transceivers 24 may be located on a smartphone located within the interior cabin area 14 of the vehicle 10.

The interior cabin area 14 of the vehicle 10 includes cargo areas of the vehicle 10. Some examples of cargo areas include, but are not limited to, the trunk of a sedan or a tailgate for a sport utility vehicle. Thus, in embodiments, the occupant detection system 12 may detect occupants in the cargo area of the vehicle 10 as well. It is to be appreciated that the occupant detection system 12 may detect the presence of individuals (i.e., humans) as well as animals such as, for example, pets that are placed within the cargo area of the vehicle 10. Furthermore, it is also to be appreciated that in embodiments the interior cabin area 14 of the vehicle 10 includes areas immediately outside of the interior cabin area 14 that are within wireless sensing proximity of the wireless control module 20. Therefore, a signal conversion device 22 may be placed immediately outside of the interior cabin area 14 of the vehicle 10 but is still in wireless communication with the wireless control module 20.

Figure 2:
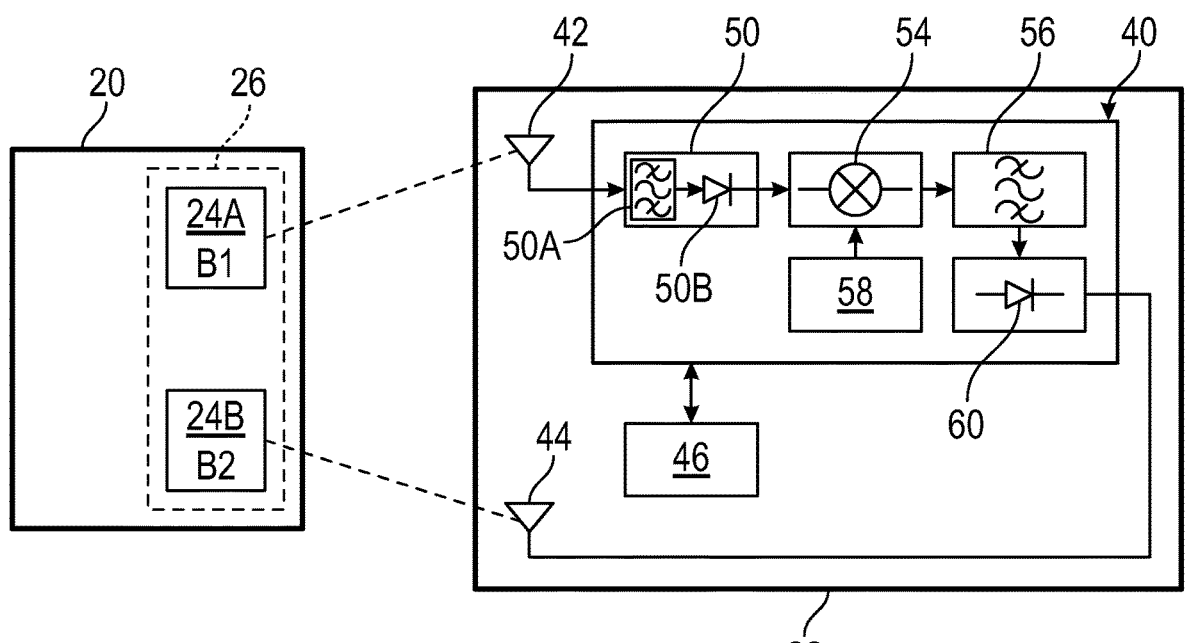
FIG. 2 is a schematic diagram of one of the signal conversion devices shown in FIG. 1, according to an exemplary embodiment.

FIG. 2 is a schematic diagram of one of the signal conversion devices 22 shown in FIG. 1. Referring to FIGS. 1 and 2, the signal conversion devices 22 each include conversion circuitry 40 for either up-converting or down-converting the signals received from one of the transceivers 24 from one frequency band to another frequency band. Specifically, in the example as shown in FIG. 2, the conversion circuitry 40 of the signal conversion device 22 is in electronic communication with a receiving antenna 42, a transmitting antenna 44, and a power source 46. The bandwidth of the receiving antenna 42 is the same as the first bandwidth B1 of the signals transmitted from the first transceiver 24A of the multi-band transceiver 26 of the wireless control module 20. Similarly, the bandwidth of the transmitting antenna 44 is the same as the second bandwidth B2 of the signals that are received by the second transceiver 24B of the multi-band transceiver 26 of the wireless control module 20.

It is to be appreciated that in embodiments the signal conversion devices 22 may include analog circuitry only, and therefore are lower in cost than other devices including components such as processors. However, it is to be appreciated that digital components may be used in some implementations. It is also to be appreciated that signal conversion devices 22 of the wireless control module 20 are used to convert between bandwidths, and that signals are emitted by the first transceiver 24A, travel to one of the signal conversion devices 22, are either up-converted or down-converted, and are then transmitted back to the same wireless control module 20, at the second transceiver 24B. In an embodiment, the signal conversion devices 22 are portable devices such as, for example, radio frequency (RF) tags that may be carried by a person or attached to items such as child car seats or strollers. In the embodiment as shown in FIG. 4, the signal conversion devices 22 may be integrated into a covering of one or more seats 100 of the vehicle 10 as well. For example, if the one or more seats 100 are covered using fabric, then the signal conversion devices 22 may be woven into the fabric of a respective seat 100.

The power source 46 is any device that provides electrical power to the conversion circuitry 40 of the signal conversion device 22. For example, the power source may be a battery or an energy harvesting device. In embodiments, the energy harvesting device captures energy from sources such as, but not limited to, radio frequency, light, vibration, and heat, and transform the energy into electrical power. It is to be appreciated that in an embodiment the conversion circuitry 40 of the signal conversion device 22 is a low-power device requiring relatively low amounts of electrical power on the scale of several hundred milliwatts.

Continuing to refer to FIGS. 1 and 2, the conversion circuitry 40 of the signal conversion device 22 includes a combined low-noise amplifier with bandpass filter (LNA+BPF) 50, a mixer 54, a second bandpass filter 56, a local oscillator 58, and a RF amplifier 60. The combined low-noise amplifier with bandpass filter 50 includes a low-noise amplifier 50A and a bandpass filter 50B. The first transceiver 24A of the wireless control module 20 continuously transmits signals at the first frequency band B1, where the signals include packets contain training symbols. As explained below, the conversion circuitry 40 of the signal conversion device 22 converts the signals received from the first transceiver 24A on the first frequency band B1 into the signals on the second frequency band B2. The signals on the second frequency band B2 are sent to the second transceiver 24B of the wireless control module 20 by the transmitting antenna 44. The wireless control module 20 performs CSI estimation by comparing the original training symbols included by the signals on the first frequency band B1 with training symbols included by the receiving signals at the second frequency band B2 to determine the presence of one or more occupants within the interior cabin area 14 based on CSI estimation. It is to be appreciated that although FIG. 2 illustrates the first transceiver 24A in wireless communication with the receiving antenna 42 and the second transceiver 24B is wireless communication with the transmitting antenna 44, it is to be appreciated that FIG. 2 is merely exemplary in nature and that the first transceiver 24A may be in wireless communication with the transmitting antenna 44 and the second transceiver 24B may be in wireless communication with the receiving antenna 42 instead.

The combined low-noise amplifier with bandpass filter 50 receives the signals on the first frequency band B1 from the receiving antenna 42, and the low-noise amplifier 50A amplifies the signal on the first frequency band B1 to improve signal quality without introducing additional noise. The bandpass filter 50B includes a passband having a center frequency at a first bandpass frequency B1. The mixer 54 and the local oscillator 58 convert the signals on the first frequency band B1 into the signals on the second frequency band B2. For example, in one embodiment, the mixer 54 and the local oscillator 58 may up-convert the signals on the 2.4 GHz frequency band into the signals on the 5 GHz frequency band. The second bandpass filter 56 includes a second passband having a center frequency equal to the second bandpass frequency B2. The second bandpass filter 56 receives the signals at the second frequency band B2 from the mixer 54 and removes any extraneous frequencies. The RF amplifier 60 receives the signal at the second frequency band B2 and increases the power the signal at the second frequency band B2. In an embodiment, the RF amplifier increases the signal at the second frequency band B2 from a low-power signal to a higher power signal before being sent to the second transceiver 24B by the transmitting antenna 44.

Referring to FIGS. 1 and 2, the wireless control module 20 determines the presence of one or more occupants within the interior cabin area 14 of the vehicle 10 by comparing the original training symbols included by the signals on the first frequency band B1 with training symbols included by the signals on the second frequency band B2 to determine one or more changes in value of one or more CSI parameters based on a signal processing approach. Specifically, the change in values of the CSI parameters are with respect to the time domain, the frequency domain, or the spatial domain, and the CSI parameters include, but are not limited to, amplitude, phase, and signal delay. As an example of a change in CSI parameters, a magnitude of a vector difference between CSI parameters may be determined. For example, in an embodiment, the wireless control module 20 determines the presence of one or more occupants based on amplitude attenuation in the time domain. It is to be appreciated that various signal processing approaches based on CSI estimation currently exist for determining the presence of one or more occupants within the interior cabin area 14 of the vehicle 10. For example, in one embodiment, the wireless control module 20 employs a principal component analysis (PCA) based time-series analysis of all of the CSI magnitudes corresponding to all subcarrier frequencies.

Figure 3:
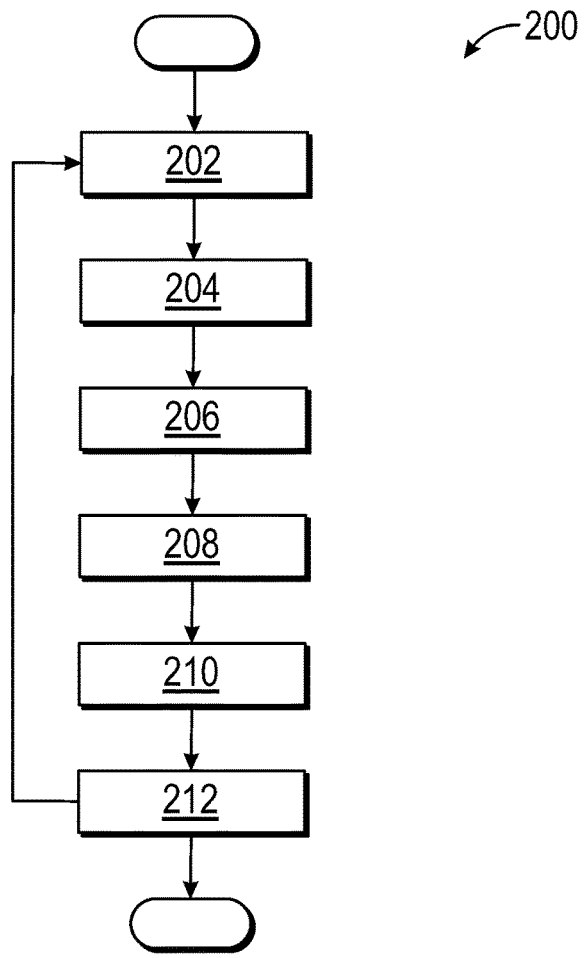
FIG. 3 is a process flow diagram illustrating a method for detecting occupants in the interior cabin area of the vehicle, according to an exemplary embodiment.

FIG. 3 is a process flow diagram illustrating an exemplary method 200 for detecting the presence of occupants within the interior cabin area 14 of the vehicle 10 using the occupant detection system 12. Referring to FIGS. 1-3, the method 200 may begin at block 202. In block 202, the first transceiver 24A of the wireless control module 20 continuously transmits, by the first transceiver 24A, signals on the first frequency band B1, where the signals include packets containing the original training symbols. The method 200 may then proceed to block 204.

In block 204, one or more of the signal conversion devices 22 receive the signals on the first frequency band B1 by the receiving antenna 42. The method 200 may then proceed to block 206.

In block 206, the conversion circuitry 40 of the signal conversion device 22 converts the signals received from the first transceiver 24A on the first frequency band B1 into the signals on the second frequency band B2. The method 200 may then proceed to block 208.

In block 208, the signals on the second frequency band B2 are sent to the second transceiver 24B of the wireless control module 20 by the transmitting antenna 44 of the signal conversion device 22. The method 200 may then proceed to block 210.

In block 210, the wireless control module 20 compares the original training symbols from the signals on the first frequency band B1 with training symbols from the signals on the second frequency band B2 to determine one or more changes in value of one or more CSI parameters based on a signal processing approach. As mentioned above, the change in CSI parameters include a change in the time domain, the frequency domain, or the spatial domain, and the CSI parameters include, but are not limited to, amplitude, phase, and signal delay. The method 200 may then proceed to block 212.

In block 212, the wireless control module 20 determines one or more occupants are present within the interior cabin area 14 of the vehicle 10 based on the change in value of the one or more CSI parameters. The method 200 may then terminate or return to block 202.

Referring generally to FIGS. 1-3, the disclosed occupant detection system provides various technical effects and benefits. Specifically, the disclosed occupant detection system provides a low-cost approach for employing wireless sensing technologies to detect the presence of occupants within the interior cabin of a vehicle. The current approach for detecting the presence of occupants in vehicles requires two control modules and may introduce additional cost since most vehicles currently only require a single control module. In contrast, the disclosed occupant detection system only requires a single control module in communication with one or more signal conversion devices, which in turn reduces the overall cost and complexity of the occupant detection system.

Figure 4A:
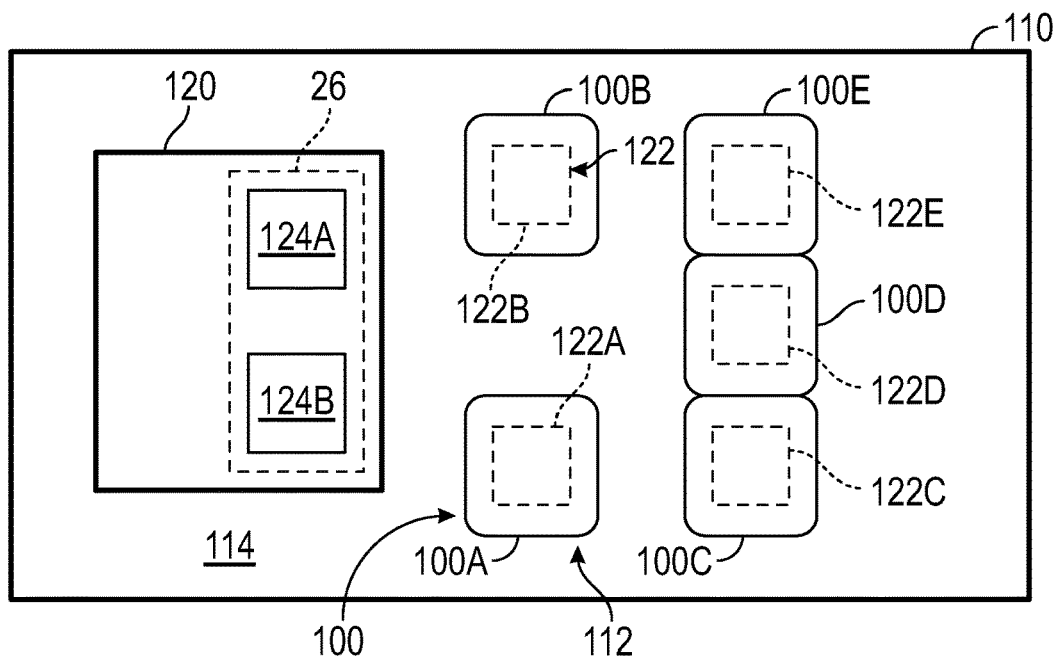
FIG. 4A illustrates an alternative embodiment of the occupant detection system including a plurality of signal conversion devices that are each installed on different seats in the interior cabin area of the vehicle, according to an exemplary embodiment.

FIG. 4A is a schematic diagram illustrating an alternative embodiment of the disclosed occupant detection system 112 including a plurality of signal conversion devices 122 that are each assigned to a unique position within an interior cabin area 114 of a vehicle 110. In the embodiment as shown in FIG. 4A, the unique position is a seat position within the interior cabin area 114 of the vehicle 10. For example, the seat position may refer to a driver seat, a passenger seat, a rear seat behind the driver, a middle seat, a rear seat behind a passenger, a third row seat behind the driver, and a third row seat behind the passenger. In the example as shown in FIG. 4A, the vehicle 110 includes five seats 100. However, it is to be appreciated that FIG. 4A is merely exemplary in nature, and the unique position in the vehicle 10 is not limited to a seat position. Instead, the unique position within the vehicle 110 may represent a cargo area in a sport utility vehicle. Furthermore, although FIG. 4A illustrates five seats 100, it is to be appreciated that the vehicle 10 may include fewer or more seats as well. Specifically, the vehicle 110 includes the following seat positions: a driver seat 100A, a passenger seat 100B, and three rear passenger seats 100C, 100D, 100E.

FIG. 4A also illustrates a signal conversion device 122A assigned to the driver seat 100A, a signal conversion device 122B assigned to the passenger seat 110B, and signal conversion devices 122C, 122D, 122E are assigned to the rear passenger seats 100C, 100D, 100E, respectively. In one embodiment, the signal conversion devices 122 are woven into the fabric of the seats 100 of the vehicle 110. As explained below, in an embodiment, the occupant detection system 112 determines the unique position of a detected presence within the vehicle 110 based on coarse-grained localization. In the embodiment as shown in FIG. 4A, the unique position of the detected presence indicates a seat position within the interior cabin area 114 of the vehicle 110. For example, if the driver seat 100A is occupied, then the occupant detection system 112 would indicate that the position of the detected presence is the driver seat 100A.

Figure 4B:
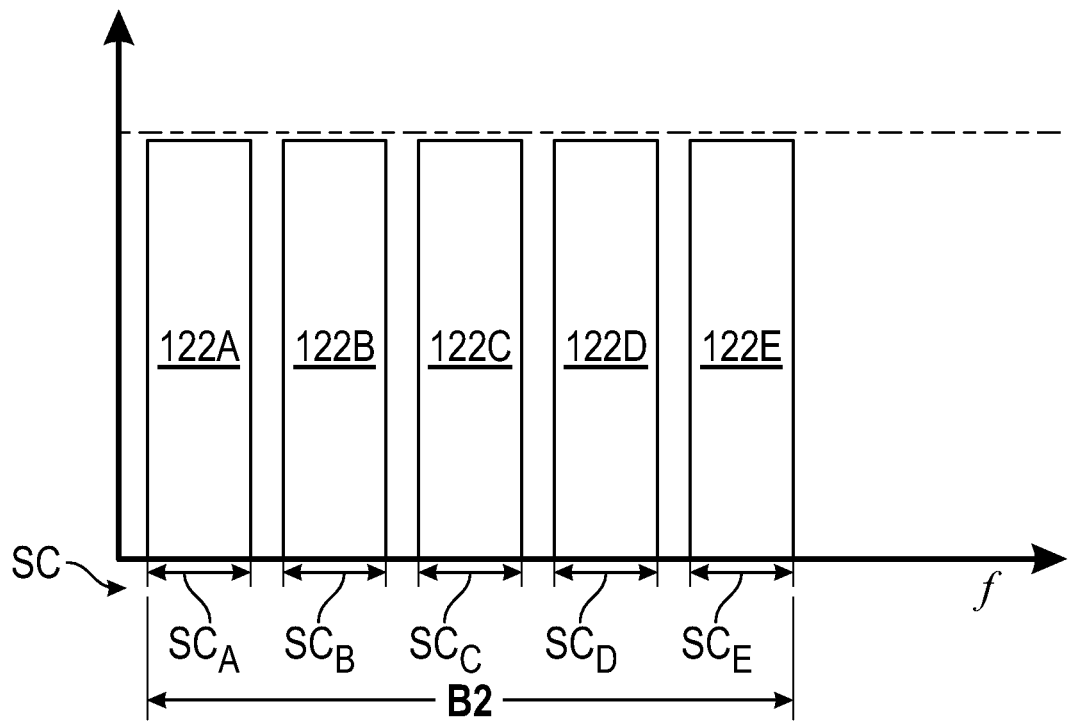
FIG. 4B is a graph illustrating unique sub-carrier frequencies assigned to each of the signal conversion devices shown in FIG. 4A, according to an exemplary embodiment.
Figure 5:
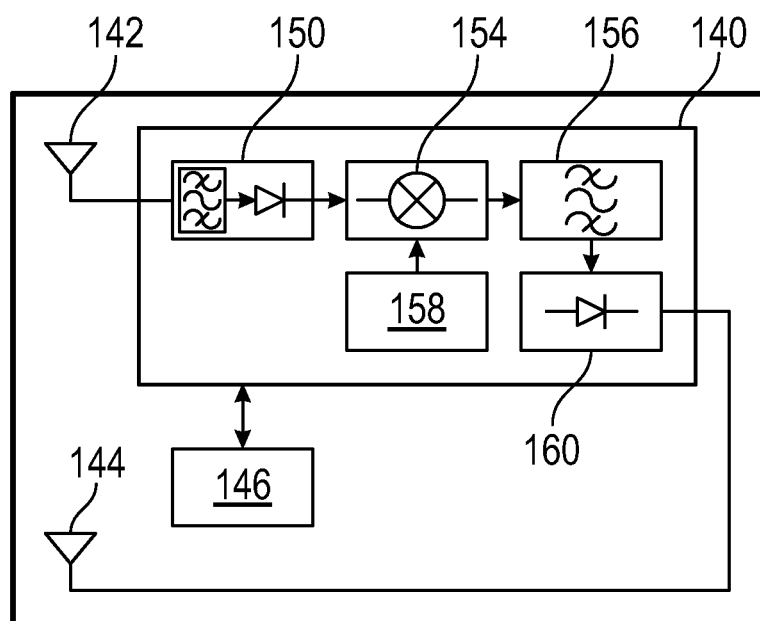
FIG. 5 illustrates an alternative embodiment of the signal conversion device shown in FIG. 2, according to an exemplary embodiment.

FIG. 4B is a graph illustrating unique sub-carrier frequencies SC assigned to each of the signal conversion devices 122 in FIG. 4A, where the x-axis represents frequency and the y-axis is a CSI parameter such as amplitude. FIG. 5 is a schematic diagram of one of the signal conversion devices 122 shown in FIG. 4A. Referring to FIGS. 4A, 4B, and 5, each signal conversion device 122 is positioned within the respective seat 100 such that a signal path between a first transceiver 124A of the wireless control module 120 and either or both the receiving antenna 142 or the transmitting antenna 144 of the respective signal conversion device 122 is obstructed when the respective seat is occupied, such as by an individual who is present in the seat 100.

The conversion circuitry 140 (seen in FIG. 5) of each signal conversion device 122 is assigned a unique sub-carrier frequency SC that is part of an overall frequency spectrum of the second frequency band B2. Therefore, when a respective one of the seats 100 located within the interior cabin area 114 is occupied, the direct signal path from the first transceiver 124A to the respective receiving antenna 142 (FIG. 5) of the wireless control module 20 is obstructed, and therefore the unique frequency range assigned to the respective seat 100 is attenuated from the overall frequency spectrum of the second bandwidth frequency B2. For example, if the driver seat 100A is occupied, then the unique sub-carrier frequency $SC_A$ assigned to the driver seat 100A is attenuated from the overall frequency spectrum of the second frequency band B2. Similarly, if the passenger seat 100B is occupied, then the unique sub-carrier frequency $SC_B$ assigned to the passenger seat 100B is attenuated from the overall frequency spectrum of the second frequency band B2. If one of the rear passenger seats 100C, 100D, 100E are occupied, then the unique sub-carrier frequency $SC_C$, $SC_D$, $SC_E$ assigned to the respective rear passenger seat 100C, 100D, 100E is attenuated from the overall frequency spectrum of the second frequency band B2.

Referring to FIG. 5, the conversion circuitry 140 of the signal conversion device 122 includes a power source 146 a combined low-noise amplifier with bandpass filter (LNA+BPF) 150, a mixer 154, a sub-carrier bandpass filter 156, a local oscillator 158, and a RF amplifier 160. The combined low-noise amplifier with bandpass filter 150 includes a low-noise amplifier 150A and a bandpass filter 150B. The conversion circuitry 140 shown in FIG. 5 is similar to the conversion circuitry 40 shown in FIG. 2, except that the sub-carrier bandpass filter 156 includes a sub-carrier passband that is equal to the unique sub-carrier frequency SC assigned to the corresponding signal conversion device 122. For example, the sub-carrier bandpass filter 156 for the signal conversion device 122A includes the sub-carrier passband that is equal to the unique sub-carrier frequency $SC_A$ of the signal conversion device 122A assigned to the driver seat 100A. Similarly, the sub-carrier bandpass filter 156 for the signal conversion device 122B includes the sub-carrier passband that is equal to the unique sub-carrier frequency $SC_B$ of the signal conversion device 122B assigned to the passenger seat 100B.

The wireless control module 120 determines a unique position of a detected presence within the interior cabin area 114 of the vehicle 110 based on coarse-grained localization, where the position of the detected presence indicates a seat position within the interior cabin area 114 of the vehicle 110. Specifically, the wireless control module 120 determines the detected presence within the interior cabin area 114 of the vehicle 110 based on detecting an absence of one or more of the unique sub-carrier frequencies SC that are part of the overall frequency spectrum of the second frequency band B2. In response to determining the detected within the interior cabin area 114 of the vehicle 110, the wireless control module 120 determines the unique position of the detected presence within the interior cabin area 114 by correlating a missing sub-carrier frequency that is part of the overall frequency spectrum of the second frequency band B2 with a corresponding unique position within the interior cabin area 114 of the vehicle 110. For example, referring to FIGS. 4A and 4B, if the missing sub-carrier frequency is the unique sub-carrier frequency $SC_A$ of the signal conversion device 122A assigned to the driver seat 100A, then the wireless control module 20 determines that the unique position of the detected presence is the driver seat 100A.

The conversion circuitry 140 (seen in FIG. 5) of each signal conversion device 122 is assigned a unique sub-carrier frequency SC that is part of an overall frequency spectrum of the second frequency band B2. Therefore, when a respective one of the seats 100 located within the interior cabin area 114 is occupied, the direct signal path from the first transceiver 124A to the respective receiving antenna 142 or the transmitting antenna 144 of the wireless control module 20 is obstructed, and therefore the unique sub-carrier frequency SC assigned to the respective seat 100 is attenuated from the overall frequency spectrum of the second bandwidth frequency B2.

Figure 6:
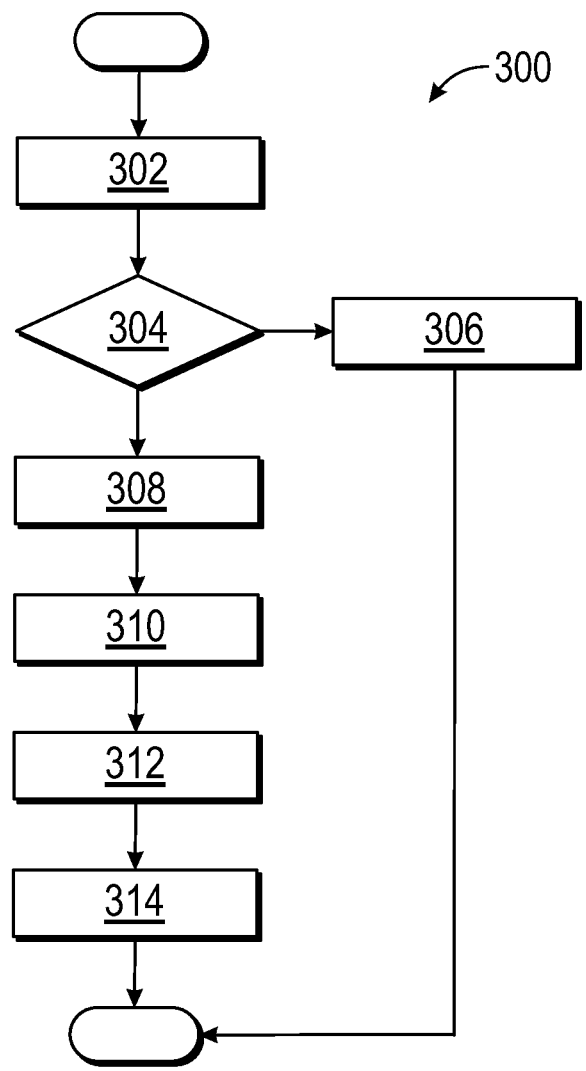
FIG. 6 is a process flow diagram illustrating a method for performing coarse-grain localization to determine a unique position of a detected presence within the interior cabin area of the vehicle, according to an exemplary embodiment.

FIG. 6 is a process flow diagram illustrating an exemplary method 300 for detecting the presence of occupants within the interior cabin area 14 of the vehicle 10 using the occupant detection system 12. Referring to FIGS. 4-6, the method 300 may begin at block 302. In block 302, the first transceiver 124A of the wireless control module 120 continuously transmits, by the first transceiver 124A, signals on the first frequency band B1. The method 300 may then proceed to decision block 304.

In decision block 304, if an occupant is present in one or more of the seats 100 in the interior cabin area 114 of the vehicle 10, then one or more of the plurality of signal conversion devices 122 do not receive the signals on the first frequency band B1 by respective the receiving antenna 142, and the method 300 may then proceed to block 306. If no occupants are present in any of the seats 100 in the interior cabin area 14 of the vehicle 10, then the method may proceed to block 306. In block 306, the wireless control module 20 determines that each unique sub-carrier frequency SC assigned to the respective seat 100 is present the overall frequency spectrum of the second bandwidth frequency B2 and therefore no presence is detected. The method 300 may terminate.

In block 308, the conversion circuitry 140 of the signal conversion devices 122 that correspond to unoccupied positions within the interior cabin area 114 of the vehicle 110 convert the signals received from the first transceiver 24A on the first frequency band B1 into the signals on the second frequency band B2. Referring specifically to FIG. 5, the sub-carrier bandpass filter 156 of the conversion circuitry 140 corresponding to the unoccupied seats 100 in the interior cabin area 114 of the vehicle 110 allows the frequencies equal to the unique sub-carrier frequency SC assigned to the corresponding signal conversion device 122 to pass. The method 300 may then proceed to block 310.

In block 310, the unique sub-carrier frequency SC of the second frequency band B2 assigned to the corresponding signal conversion device 122 is sent to the second transceiver 124B of the wireless control module 120 by the transmitting antenna 144 of the corresponding signal conversion device 22. The method 200 may then proceed to block 312.

In block 312, the wireless control module 120 determines the detected presence within the interior cabin area 114 of the vehicle 10 based on detecting an absence of one or more of the unique sub-carrier frequencies SC that are part of the overall frequency spectrum of the second frequency band B2. The method 300 may then proceed to block 314.

In block 314, in response to determining the detected within the interior cabin area 114 of the vehicle 110, the wireless control module 120 determines the unique position of the detected presence within the interior cabin area 114 by correlating a missing sub-carrier frequency that is part of the overall frequency spectrum of the second frequency band B2 a corresponding unique position within the interior cabin area 114 of the vehicle 10. The method 300 may then terminate.

Referring generally to FIGS. 4-6, the disclosed occupant system provides various technical effects and benefits by providing a low-cost approach to determine the position of a detected presence in a vehicle. In embodiments, the detected presence may be a seat position of an occupant in the vehicle. Current systems presently available to determine the seat position such as, for example, weight sensors, add significant cost to the vehicle. In contrast, the disclosed occupant detection system only requires a single control module in communication with one or more signal conversion devices, which in turn reduces the overall cost and complexity of the occupant detection system.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An occupant detection system for determining a unique position of a detected presence within an interior cabin area of a vehicle, the occupant detection system comprising:
   a plurality of signal conversion devices each including conversion circuitry, wherein each of the plurality of signal conversion devices are assigned to a specific position within the interior cabin area of the vehicle, and wherein the conversion circuitry for each of the plurality of signal conversion devices include unique sub-carrier frequency that corresponds to the unique position within the interior cabin area of the vehicle; and
   a wireless control module including a multi-band transceiver having a first transceiver configured to transmit and receive signals on a first frequency band and a second transceiver configured to transmit and receive signals on a second frequency band, wherein each unique sub-carrier frequency of the plurality of signal conversion devices is part of an of an overall frequency spectrum of the second frequency band, and wherein the wireless control module executes instructions to:
   determine the detected presence within the interior cabin area of the vehicle based on detecting an absence of one or more unique sub-carrier frequencies that are part of the overall frequency spectrum of the second frequency band; and
   in response to determining the detected presence within the interior cabin area of the vehicle, determine the unique position of the detected presence within the interior cabin area by correlating a missing sub-carrier frequency that is part of the overall frequency spectrum of the second frequency band with a corresponding unique position within the interior cabin area of the vehicle.

2. The occupant detection system of claim 1, wherein the unique position of the detected presence indicates a seat position within the interior cabin area of the vehicle.

3. The occupant detection system of claim 2, wherein the seat position includes one or more of the following: a driver seat, a passenger seat, a rear seat behind the driver, a middle seat, a rear seat behind a passenger, a third row seat behind the driver, and a third row seat behind the passenger.

4. The occupant detection system of claim 2, wherein the plurality of signal conversion devices are integrated into a covering of a respective seat of the vehicle.

5. The occupant detection system of claim 1, wherein the conversion circuitry includes a sub-carrier bandpass filter having a sub-carrier passband that is equal to the unique sub-carrier frequency assigned to a corresponding signal conversion device.

6. The occupant detection system of claim 1, wherein the conversion circuitry of each of the plurality of signal conversion devices include a combined low-noise amplifier with bandpass filter.

7. The occupant detection system of claim 6, wherein the combined low-noise amplifier and bandpass filter includes a bandpass filter including a passband having a center frequency at a first bandpass frequency.

8. The occupant detection system of claim 1, wherein the conversion circuitry of each of the plurality of signal conversion devices include a mixer and a local oscillator that convert the signals on the first frequency band into the signals on the second frequency band.

9. The occupant detection system of claim 1, wherein the wireless control module supports a wireless communication protocol that employs training symbols for performing channel state information (CSI) estimation.

10. The occupant detection system of claim 1, wherein the plurality of signal conversion devices are radio frequency (RF) tags.

11. The occupant detection system of claim 1, wherein the interior cabin area of the vehicle includes cargo areas of the vehicle.

12. The occupant detection system of claim 1, wherein the interior cabin area of the vehicle includes areas immediately outside of the interior cabin area that are within wireless sensing proximity of the wireless control module.

13. An occupant detection system for determining a seat position of a detected presence within an interior cabin area of a vehicle, the occupant detection system comprising:
   a plurality of signal conversion devices each including conversion circuitry, wherein each of the plurality of signal conversion devices are assigned to a specific position within the interior cabin area of the vehicle, and wherein the conversion circuitry for each of the plurality of signal conversion devices include unique sub-carrier frequency that corresponds to the seat position within the interior cabin area of the vehicle; and a wireless control module including a multi-band transceiver having a first transceiver configured to transmit and receive signals on a first frequency band and a second transceiver configured to transmit and receive signals on a second frequency band, wherein each unique sub-carrier frequency of the plurality of signal conversion devices is part of an of an overall frequency spectrum of the second frequency band, and wherein the wireless control module executes instructions to:

determine the detected presence within the interior cabin area of the vehicle based on detecting an absence of one or more unique sub-carrier frequencies that are part of the overall frequency spectrum of the second frequency band; and in response to determining the detected presence within the interior cabin area of the vehicle, determine the seat position of the detected presence within the interior cabin area by correlating a missing sub-carrier frequency that is part of the overall frequency spectrum of the second frequency band with a corresponding seat position within the interior cabin area of the vehicle.

14. The occupant detection system of claim 13, wherein the seat position includes one or more of the following: a driver seat, a passenger seat, a rear seat behind a driver, a middle seat, a rear seat behind a passenger, a third row seat behind the driver, and a third row seat behind the passenger.

15. The occupant detection system of claim 13, wherein the plurality of signal conversion devices are integrated into a covering of a respective seat of the vehicle.

16. The occupant detection system of claim 13, wherein the conversion circuitry includes a sub-carrier bandpass filter having a sub-carrier passband that is equal to the unique sub-carrier frequency assigned to a corresponding signal conversion device.

17. The occupant detection system of claim 13, wherein the conversion circuitry of each of the plurality of signal conversion devices include a combined low-noise amplifier with bandpass filter.

18. The occupant detection system of claim 17, wherein the combined low-noise amplifier and bandpass filter includes a bandpass filter including a passband having a center frequency at a first bandpass frequency.

19. The occupant detection system of claim 13, wherein the conversion circuitry of each of the plurality of signal conversion devices include a mixer and a local oscillator that convert the signals on the first frequency band into the signals on the second frequency band.

20. The occupant detection system of claim 13, wherein the interior cabin area of the vehicle includes cargo areas of the vehicle.

* * * * *